United States Patent [19]

Hirschman et al.

[11] Patent Number: 5,623,322
[45] Date of Patent: Apr. 22, 1997

[54] PULL DOWN MEMBER ON TEMPLE OF EYEGLASSES

[75] Inventors: Jason Hirschman, Arlington, Va.; Chul W. Shin, Masan, Rep. of Korea; Chang W. Kang, Masan, Rep. of Korea; Ji W. Kim, Masan, Rep. of Korea

[73] Assignee: Hudson Optical Corporation, Bohemia, N.Y.

[21] Appl. No.: 567,139

[22] Filed: Dec. 4, 1995

[51] Int. Cl.$^6$ ........................................... G02C 5/14
[52] U.S. Cl. ............................ 351/119; 351/111; 351/123
[58] Field of Search ...................... 351/118, 119, 351/123, 121, 111, 122, 41, 158; 2/426, 428

[56] References Cited

U.S. PATENT DOCUMENTS 2,172,959  9/1939  Hirtenstein ................................ 351/119
4,790,645  12/1988  Gish ......................................... 351/119

*Primary Examiner*—Hung X. Dang
*Attorney, Agent, or Firm*—Ostrolenk, Faber, Gerb & Soffen, LLP

[57] ABSTRACT

A pull-down member is pivotably and ratchetly attached to the distal end of the end-piece of each eyeglass temple. Each pull-down member is pivotably displaceable to the end-piece at a series of angles, and thereby provides a snug fit of the eyeglasses on the user's face. In one embodiment, the pull-down member comprises a disk-shaped core having an edge on which is attached an elongated appendage which is the portion of the pull-down member abutting against the user's ear. The edge of the core also includes a series of notches which are biased by a ball and spring mechanism to provide the pivotable and ratchetable displacement of the pull-down member relative to the end-piece of the eyeglass temple. In another embodiment of the pull-down member, the core has a central opening defined by a series of teeth. A split-pin having a complementary series of teeth along an outer surface thereof engages the toothed opening of the core to provide the pivotable and ratchetable displacement of the pull-down member relative to the end-piece of the eyeglass temple.

29 Claims, 3 Drawing Sheets

PULL DOWN MEMBER ON TEMPLE OF EYEGLASSES

BACKGROUND OF THE INVENTION

The present invention relates to an improvement in eyeglass frames, and more particularly to a pull-down member attached to an eyeglass frame for holding the eyeglass frame snugly but comfortably against the user's face.

It is very inconvenient when eyeglasses slip down the nose of the user and have to be continuously adjusted on the user's face. This is not only inconvenient, but particularly hazardous when it comes to safety glasses. If safety glasses are not continuously positioned atop the user's nose so as to adequately protect the eyes, injury or worse can occur from flying objects and debris because the eyes were not properly shielded.

This problem of eyeglasses slipping down the user's nose is a very common occurrence in warm weather, but also occurs when the user is involved in a physically demanding activity. It is under these circumstances that a user is most vulnerable to injury even though he or she is wearing safety glasses, if those safety glasses are not properly positioned on the user's face and retained in such position.

The slippage of eyeglasses from the user's nose can also counter the positive effect of ultraviolet protection offered by many eyeglass lenses. Eyecare professionals, as well as eyeglass users, are concerned with the harmful effects ultraviolet radiation can have on the eyes, and in particular its possible linkage to cataracts and other eye diseases. Most optical laboratories offer ultraviolet protection for their lenses. However, if eyeglasses slip as little as one-quarter of an inch (approximately six millimeters) down the user's nose, a significant amount of ultraviolet radiation could be incident on the eyes. If the eyeglasses slip as much as one inch down the nose, then almost all the ultraviolet protection provided by the lenses is ineffective and virtually all the ultraviolet light strikes the eyes.

Approximately 60 percent of the eyeglass wearing population wears multifocal lenses, such as bifocals, trifocals, etc. The position of the segments of these multifocal lenses is critical and varies with the type of lenses, as well as the position of the user's eyelids in relation to the eyeglass frame. If the user's glasses slide one quarter of an inch, the position of a pair of bifocals may be displaced 100 percent from where the segments should be positioned. By looking through the incorrect segments of multifocal lenses, an individual may not only be inconvenienced, but could be injured because of impaired vision.

Also, the displacement of eyeglasses worn by sportsmen also poses problems, especially with respect to sporting glasses specialized for fisherman, cyclists or golfers. With respect to each of these sports, as well as many others, individuals complain about their eyeframes falling off or sliding down their noses. Fisherman often lose their glasses in the water, golfers cannot tolerate the slightest movement of their eyeglasses, and cyclists do not like to risk moving their hands to push their glasses back into position. Thus, there are numerous and very real problems associated with the displacement of eyeglasses from their proper position on the user's face.

To rectify these problems, devices such as elastic or elasticized bands are attached from one end of an eyeglass temple to the other end to retain the eyeglasses on the user's face. However, these elastic bands are often uncomfortable and often cause the eyeglasses to rub against the user's nose and ears causing irritation. Also, it is very common that when one wishes to employ such elastic bands or straps, they cannot be found or located because they are not a permanent attachment to the eyeglasses. Since these elastic straps or bands are relatively inconspicuous, they are easily lost or misplaced at a time when they are most needed. While it is not uncommon to see athletes and workers use these elastic bands, there are nonetheless many disadvantages inherent with their use.

The problem of eyeglass slippage has for many years been addressed by the use of what has commonly been known as "cable temples" or "curl temples." These temples simply wrap around the ear. Originally, such temples were made of metal, but in more recent years they have been covered with plastic or silicon, and in some applications are completely fabricated from plastic. However, the problem with cable temples is that most eyeglass users find them uncomfortable. The reason is simple. The curvature of the cable temples do not match the curvature of the user's ear. Individuals not only have different size ears, but different shaped ears. Also, the shape of an ear is not a smooth curve. Since the curvature of a cable temple is fixed, it cannot be easily contoured to the curvature of a user. Also, since cable temples "wrap around" the user's ear, they tend to exert pressure in some areas and are loose in other areas. Thus, the cable temples are not an adequate solution to this vexing problem.

SUMMARY OF THE INVENTION

It is an object of the present invention to overcome the aforementioned problems and disadvantages associated with elasticized bands and other means used to retain eyeglasses one's face.

Another object of the present invention is to provide a pull-down device which is permanently attached to the eyeglass frame and which comfortably retains the frame on the user's face.

A further object is to provide a pull-down member which merely touches the user's ears and does not wrap around the ears.

Yet another object of the present invention is to provide a pull-down member which has a series of positions relative to the eyeglass frame so as to comfortably accommodate the pull-down member to a universe of users because of the selectivity of positions available.

According to the present invention, the foregoing and other objects and advantages are achieved by eyeglasses having a lens frame and a pair of temples to which are attached an elongated pull-down member. The pull-down member is ratchetably and pivotably attached to a distal end of each end-piece of each temple. The pull-down member is oriented at any of a series of pivoted positions relative to the end-piece to provide the eyeglasses with a snug fit.

In one embodiment of the present invention, the pull-down member has an edge with a plurality of notches therein and an elongated appendage with a contoured edge adapted to rest against the ear of the eyeglass user. A biasing means is housed within each end-piece and positioned therein to be capable of ratchetably engaging the notched edge of the pull-down member, and thereby provide the pull-down member with a series of pivotable positions with respect to the end-piece.

In a second embodiment of the present invention, the elongated pull-down member has an opening defined by a series of teeth, and a split-pin having a complimentary series of teeth along an outer surface thereof is used to pivotably retain the pull-down member at the end-piece of each temple. The toothed opening of the pull-member engages the toothed outer surface of the split pin such that by the application of an appropriate force the elongated pull-down member is capable of being pivotably and ratchetably positioned at any of several predetermined positions relative to the end-piece.

The pull-down member of the present invention will typically be attached to a distal end of the end-piece of each eyeglass temple.

Other features and advantages of the present invention will become apparent from the following description of the invention which refers to the accompanying drawings.

BRIEF DESCRIPTION OF THE DRAWING(S)

DETAILED DESCRIPTION OF THE INVENTION

Figure 1:
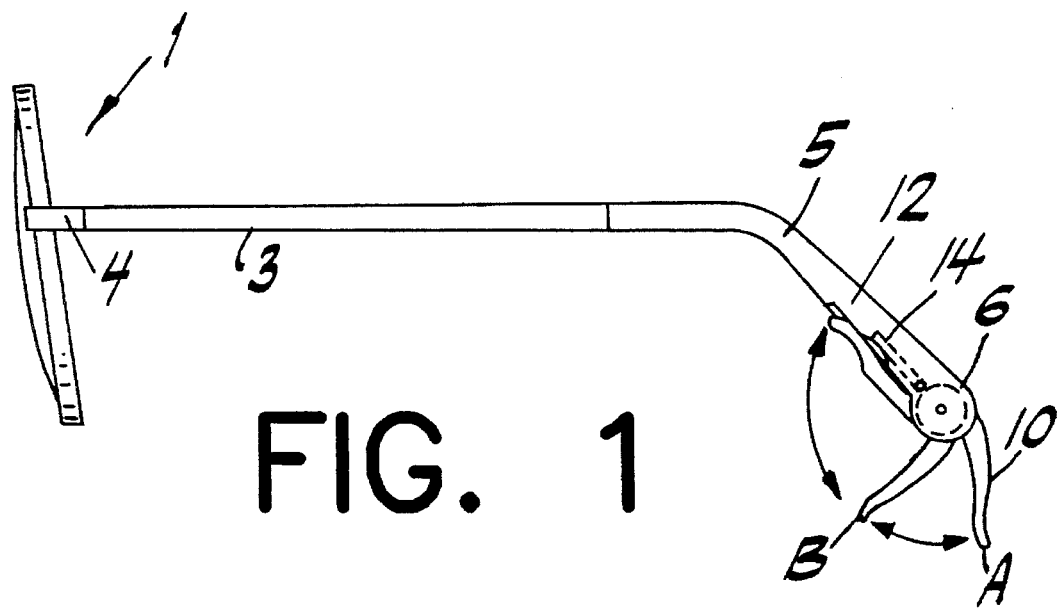
FIG. 1 is a side view of eyeglasses having the pull-down member of the present invention.

Referring to the drawings, wherein like numerals indicate like elements, there is shown in FIG. 1, a pair of eyeglasses 1 comprising a lens frame 2 for conventional or safety lenses, and a pair of temples 3 pivotably attached at a proximal end 4 to lens frame 2. At its distal end 6, each temple has an end-piece 5 that is shaped to extend behind an ear of the wearer of eyeglasses. An elongated pull-down member 10 is ratchetably and pivotably attached to each end-piece 5 at its distal end 6. Pull-down member 10 is typically made of a soft and pliant material, such as a soft plastic, and is positionable at different angles relative to end-piece 5 so as to snugly fit the eyeglasses 1 to the wearer. While the pull-down member 10 touches a small area of the user's ear, it does not wrap-around the ear which can be uncomfortable. The pivotable positioning of the pull-down member 10 about the distal end 6 is generally shown in FIG. 1 wherein pull-down member is shown at a maximum angular displacement to end-piece 5 at position A, and at an intermediate angular displacement from end-piece 5 at position B.

Pull-down member 10 can also be pivotably rotated within a recess 12 in endpiece 5 when the pull-down member is not in use. When received in recess 12, pull-down member 10 is fully received therein, but may nonetheless rest on the wearer's ear at one edge thereof. An arcuate recess 14 may be formed in recess 12 so as to aid the user in grasping the pull-down member when it is positioned within recess 12.

Figure 2:
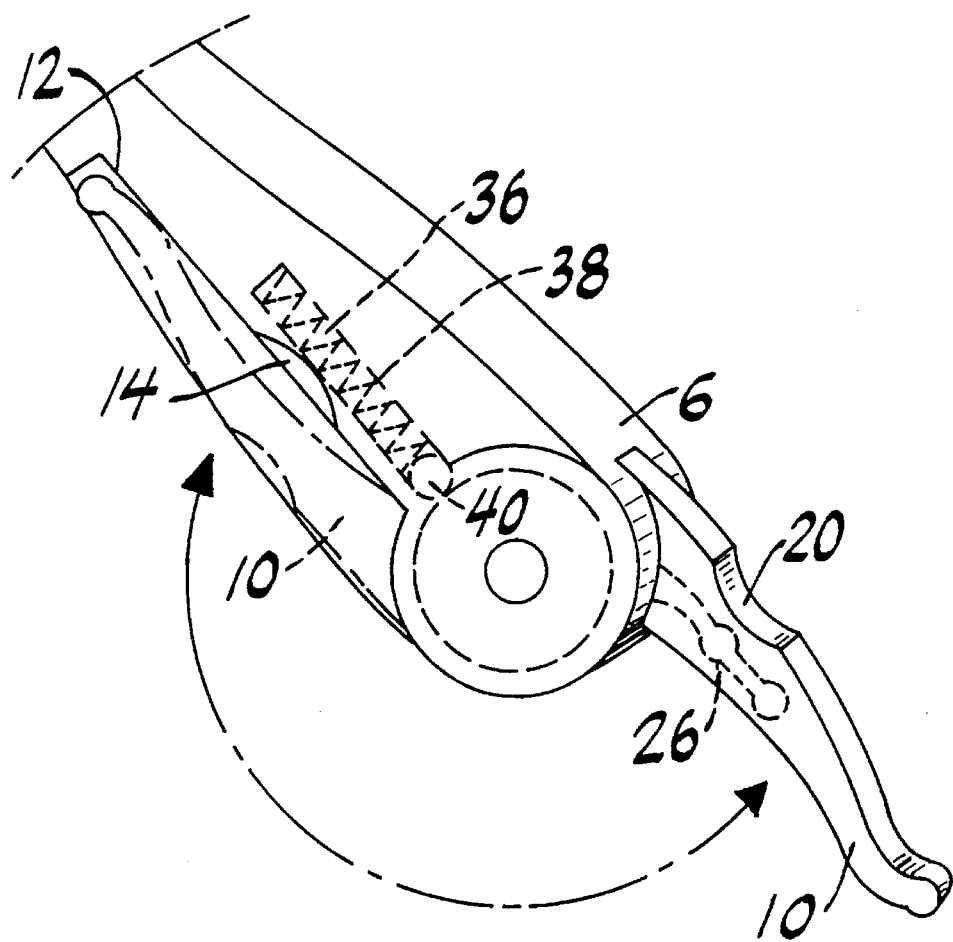
FIG. 2 is a perspective, enlarged view of a first embodiment of the pull-down member of the present invention.
Figure 5:
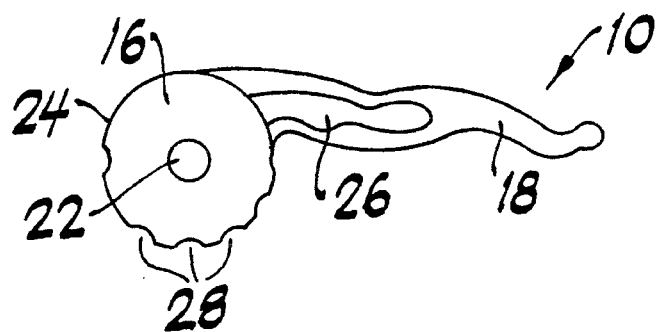
FIG. 5 is a side view of the pull-down member of the first embodiment apart from the eyeglass frame.

Referring to FIG. 5, pull-down member 10 includes a disk-shaped core 16 attached to an elongated appendage 18 which is the portion of pull-down member 10 which is intended to rest against the user's ear. Typically, elongated appendage 18 is of a soft, pliable plastic, and core 16 is of a harder or durable plastic, such as a polycarbonate plastic. An arcuate shaped recess 20 (FIG. 2) may be formed in elongated appendage 18 so as to accommodate the tip of a user's finger for the ready displacement of pull-down member 10 about the distal end 6 of end-piece 5.

Core 16 has a centrally disposed opening 22 and an outer edge 24 to which elongated appendage 18 is attached. A core appendage 26 extends from outer edge 24 and is received in elongated appendage 18 so as to better secure core 16 to appendage 18. Outer edge 24 also accommodates a series of notches 28 on a portion thereof, which in part account for the positions by which the pull-down member 10 is angularly displaced from end-piece 5.

Figure 3:
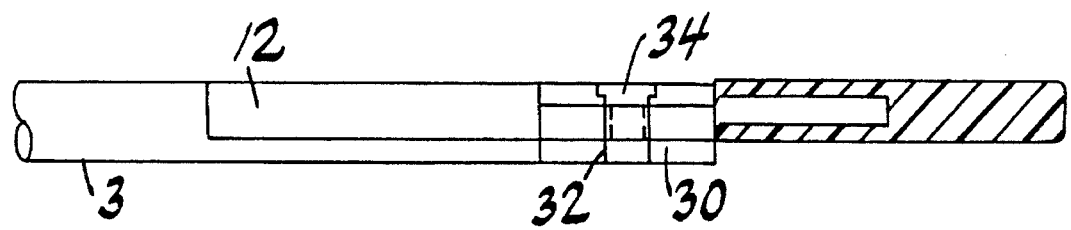
FIG. 3 is a cross-sectional, bottom view of the first embodiment of the present invention attached to an end-piece of an eyeglass temple.

At the distal end 6 of end-piece 5 a disk-shaped opening 30 is formed to accommodate core 16 of pull-down member 10. An opening 32 (FIG. 3) extends through distal end 6 in a direction transverse to the disk-shaped opening 30. Transverse opening 32 of distal end 6 is aligned with central opening 22 of core 16 so that a pin 34 can be snap-fit through openings 32 and 22 to retain pull-down member 10 to distal end 6.

Figure 4:
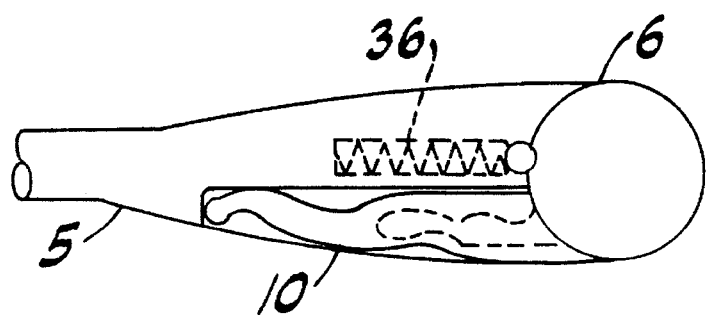
FIG. 4 is a side view of the pull-down member of the first embodiment.

Extending along the longitudinal axis of each end-piece 5 is a channel 36 (FIG. 4) which extends to the disk-shaped opening 30 at distal end 6 of end-piece 5. Housed within channel 36 is a coil spring 38 which is compressed against a ball member 40 positioned at the end of channel 36 so as to abut against edge 24 of core 16, and is thereby adapted to respectively engage notches 28. Thus, by means of the coil spring 38 and ball 40 a biasing pressure is applied to core 16 at edge 24 and notches 28 so that by the application of pivotable motion to pull-down member 10, the pull-down member can be angularly displaced at various positions relative to end-piece 5 when the ball 40 is biased into notches 28. In other words, when ball member 40 is biased into a notch 28 of core 16, the pull-down member is locked into an angular position relative to the end-piece 5 until further pivotably motion is applied to pull-down member 10 to cause it to be angularly displaced to another position relative to end-piece 5.

A second embodiment of the present invention is disclosed with respect to FIGS. 6–9 wherein like numerals indicate like elements relative to the first embodiment.

Figure 7:
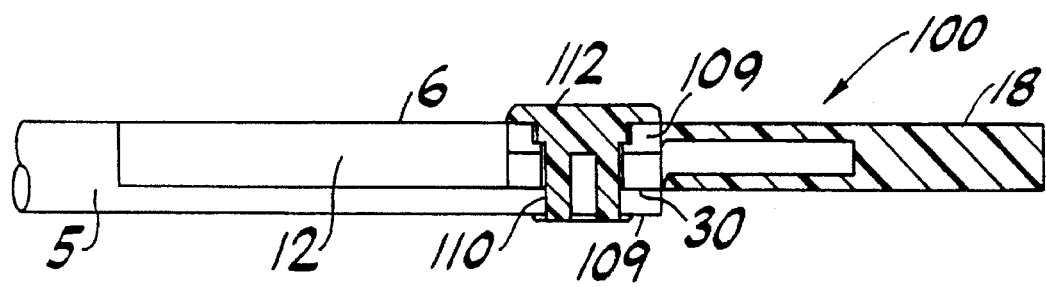
FIG. 7 is a bottom view, partly in cross-section of the second embodiment of the pull-down member of the present invention.
Figure 6:
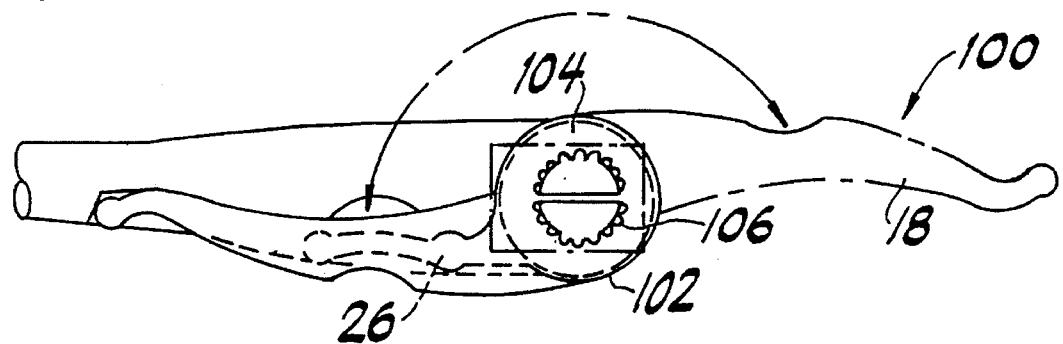
FIG. 6 is a partially cross-sectional, side view of a second embodiment of the pull-down member of the present invention.

Referring to FIGS. 6 and 7, the second embodiment of the pull-down member is designated by the numeral 100 and includes an elongated appendage 18 attached to an edge 102 of a core 104. Core 104 is generally disk-shaped and like core 16 of the first embodiment is typically made of a hard plastic such as a polycarbonate plastic. Also like core 16, core 104 includes an appendage 26 which extends into the elongated appendage 18. An opening 106 (FIGS. 6 and 8) is centrally disposed in core 104 and is defined by a series of teeth 108.

A disk-shaped opening 30 is formed in the distal end 6 of pull-down member 5 (FIG. 7) to accommodate core 104 between two spaced-apart disks 109. A further opening 110 is positioned transversely to the opening 30 and extends through each of the disks 109.

Central opening 106 of core 104 is aligned with opening 110 of distal end 6 and a split pin 112 (FIG. 7) is positioned in opening 110 so as to retain pull-down member 100 at the distal end 6 of end-piece 5.

Figure 9:
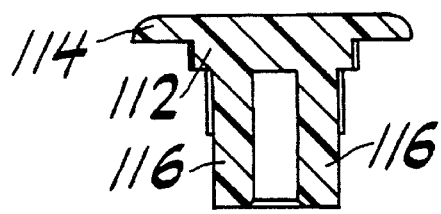
FIG. 9 is a cross-sectional view of the split-pin used in conjunction with the second embodiment of the pull-down member of the present invention.
Figure 8:
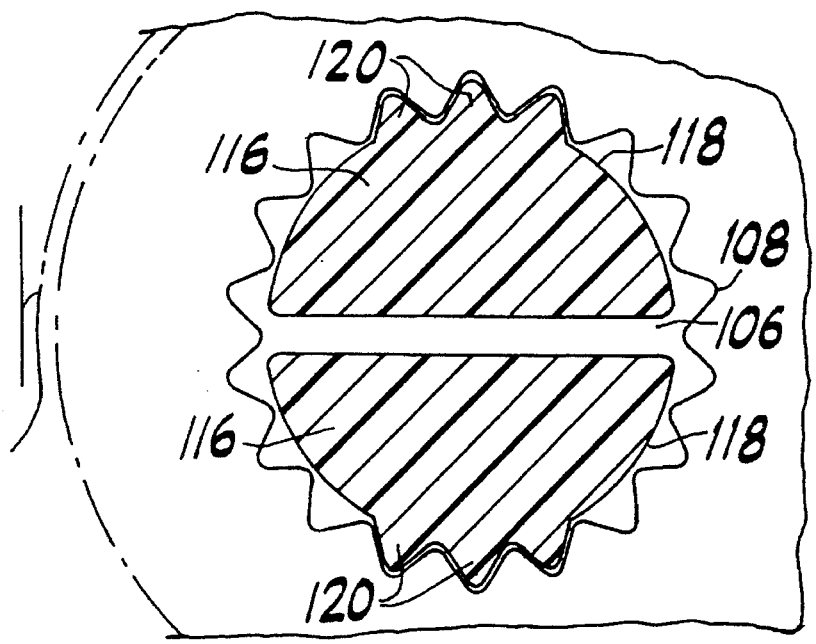
FIG. 8 is an enlarged, partially cross-sectional view of the second embodiment of the pull-down member of the present invention.

Referring to FIGS. 7, 8 and 9, split pin 12 incudes a flattened-out portion 114 with two spaced apart legs 116 extending from portion 114. Legs 116 have a cross-sectional configuration which is generally semi-circular (FIG. 8). Extending along an outer surface 118 of each leg 116 are a series of teeth 120 mateable with the teeth 108 defining central opening 106 of core 104.

With teeth 108 of central opening 106 engaging teeth 120 of split pin 112, the pull-down member 100 is retained in an angular position relative to end-piece 5. If the user, however, pivotably displaces pull-down member 100, the teeth 108 which engage teeth 120 will thereby disengage the teeth 120 since the pivotable force applied to pull-down member 100 will cause legs 116 to collapse towards one another thereby disengaging teeth 120 from teeth 108. Once the application of this pivotable force is stopped, teeth 120 will engage others of the teeth 108 with the result that the pull-down member 100 is displaced to another angular position relative to end-piece 5. Thus, by these means the pull-down down member 100 is pivotably and ratchetably displaceable relative to the end-piece 5.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. Eyeglasses, comprising:

lens frame adapted for accommodating lenses;

a pair of temples, each attached at one end to said lens frame and having an end-piece at an opposite end thereof, said end-piece being configured to wrap partially around an ear of a wearer of said eyeglasses;

an elongated pull-down member ratchetably and pivotably attached to a distal end of each end-piece, said elongated pull-down member oriented at any of a series of pivoted positions relative to said end-piece to provide the eyeglasses with a secure fit on a wearer by resting adjacent an ear of the wearer.

2. The eyeglasses according to claim 1, wherein said elongated pull-down member is adapted to extend partially behind an ear of a wearer and touch a small area of the ear of the user at or near the rear of said ear.

3. Eyeglasses, comprising:

a lens frame adapted for accommodating lenses;

a pair of temples, each attached at one end to said lens frame and having an end-piece at a downwardly extending opposite end thereof, said end-piece being configured to extend partially behind an ear of a wearer of said eyeglasses;

a pull-down member pivotably attached to each end-piece at its lower end, and having an edge with a plurality of notches therein and an elongated appendage with an edge thereof adapted to rest adjacent the ear of an eyeglass user; and a biasing mechanism housed within each said end-piece and positioned therein to be capable of ratchetably engaging said notched edge of said pull-down member and thereby said pull-down member being adapted for positioning at any of a series of pivoted positions with respect to said end-piece.

4. The eyeglasses according to claim 3, wherein said pull-down member includes:

a disk-shaped core having said notched edge; and another elongated appendage which is attached to said core and spaced from said notches on said edge.

5. The eyeglasses according to claim 4, wherein said core is of a durable plastic.

6. The eyeglasses according to claim 4, wherein said elongated appendage is of a material which is comfortable on the ear of a user.

7. The eyeglasses according to claim 4, wherein said elongated appendage has opposite edges, one of said edges being curved for resting against the eyeglass user's ear, and the opposite edge having a recess therein usable by the user in pivotably and ratchetably positioning the elongated appendage member relative to the end-piece.

8. The eyeglasses according to claim 3, wherein said biasing mechanism includes:

a biasing member housed within said end-piece, an engagement member biased by said biasing member for ratchetably engaging the notched edge of said pull-down member.

9. The eyeglasses according to claim 8, wherein said biasing member is a spring.

10. The eyeglasses according to claim 8, wherein said engagement member is ball shaped.

11. The eyeglasses according to claim 3, wherein each said end-piece having a distal end, with a pull-down member attached to the distal end of each end-piece.

12. Eyeglasses, comprising:

a lens frame adapted for accommodating lenses;

a pair of temples, each attached at one end to said lens frame and having an end-piece at an opposite end thereof;

a pull-down member pivotably attached to each end-piece, and having an edge with a plurality of notches therein and an elongated appendage with an edge thereof adapted to rest on or near the ear of an eyeglass user; and a biasing mechanism housed within each said end-piece and positioned therein to be capable of ratchetably engaging said notched edge of said pull-down member and thereby said pull-down member being adapted for positioning at any of a series of pivoted positions with respect to said end-piece;

said end-piece having a cutout area and said pull-down member being capable of being pivotably positioned into said cut-out area.

13. The eyeglasses according to claim 12, wherein said cut-out area has a recess adapted to be used for grasping said elongated appendage member to displace said elongated appendage member from said cut-out area.

14. Pull-down members for eyeglasses having a pair of temples with downwardly extending end-pieces, each of said end-pieces being configured to wrap partially around an ear of a wearer of said eyeglasses, said pull-down members being for the purpose of securely positioning said eyeglasses on the wearer, each said pull-down member comprising:

a ratcheting mechanism attached to said end-piece of a temple at its lower end; and a resilient, elongated appendage extending from said ratcheting mechanism and adapted by actuation of said ratcheting mechanism to be set at a predetermined angular positional relative to said end-piece for securely fitting said eyeglasses to a wearer by resting on or near the ear of the user.

15. The pull-down member according to claim 14, wherein said pull-down member is pivotably attached to a distal end of said end-piece.

16. The pull-down member according to claim 14, wherein said ratcheting mechanism includes;
- a core member having an edge with a plurality of ratcheting recesses, said elongated appendage attached to said core member and spaced from said ratcheting recesses, and
- a biasing mechanism engageable with and disengageable from said ratcheting recesses by pivotal movement of said elongated appendage about said end-piece and thereby setting said elongated appendage in any of said predetermined angular positions relative to said end-piece.

17. The pull-down member according to claim 14, wherein said ratcheting mechanism includes:
- a core member having an inner opening defined by a plurality of teeth, said elongated appendage attached to an outer surface of said core member, and
- a split-pin extending from said end-piece and having an outer surface thereof with a series of teeth, said toothed outer surface of said split-pin engaging the toothed inner opening of said core member thereby to provide pivotable and ratchetable orientation of said elongated appendage relative to said end-piece.

18. Eyeglasses, comprising:
- a lens frame adapted for accommodating lenses;
- a pair of temples, each attached at one end to said lens frame and having an end-piece at an opposite end thereof;
- a split-pin having a series of teeth along an outer surface thereof and extending from an end-piece; and
- an elongated pull-down member having an opening defined by a series of teeth, said toothed opening of said pull-down member engaging the toothed outer surface of said split-pin such that by the application of a force said elongated pull-down member capable of pivotably and ratchetably being positioned at any of several predetermined positions relative to said end-piece.

19. The eyeglasses according to claim 18 including a split-pin extending from each end-piece, and an elongated pull down member engaging each said split-pin.

20. The eyeglasses according to claim 18, wherein said elongated pull-down member includes a core member which is disk-like in shape with said toothed opening therein, and an elongated appendage attached to and extending from said core member.

21. The eyeglasses according to claim 20, wherein said core member has an elongated extension extending therefrom and into said elongated appendage.

22. The eyeglasses according to claim 20, wherein said core member is of a durable plastic.

23. The eyeglasses according to claim 20, wherein said elongated appendage is of a material which is comfortable against the ear of a user.

24. The eyeglasses according to claim 20, wherein said elongated appendage has opposite edges, one of said edges curved for resting against an eyeglass user's ear, and the opposite edge having a recess therein for grasping said elongated appendage to pivotably and ratchetably position said elongated appendage relative to the end-piece.

25. The eyeglasses according to claim 20, wherein said end-piece has a cut-out area and said elongated pull-down member is capable of being pivotably positioned into said cut-out area.

26. The eyeglasses according to claim 25, wherein said cut-out area has a recess adapted to be used for grasping said elongated appendage member to displace said elongated appendage from said cut-out area.

27. The eyeglasses according to claim 18, wherein said split-pin has a slotted opening extending to its outer surface and dividing a portion of said split-pin into two sections, said divided portion of said split-pin adapted to engage said elongated pull-down member.

28. The eyeglasses according to claim 27, wherein said two sections of said split-pin each accommodate teeth of the outer surface of said split-pin, and said two sections adapted to close upon each other through said slotted opening when a force is applied to pivotably and ratchetably displace said elongated pull-down member to another position relative to said end-piece.

29. The eyeglasses according to claim 18, wherein said elongated pull-down member engages a distal end of said end-piece.

* * * * *